May 18, 1965 G. W. OFFENSEND ETAL 3,183,816

CARD SHINGLING DEVICE

Filed Jan. 30, 1961 5 Sheets-Sheet 1

GLEN W. OFFENSEND
CHARLES E. SWING
GORDON L. BARRINGER
INVENTORS

BY

ATTORNEYS

May 18, 1965 G. W. OFFENSEND ETAL 3,183,816

CARD SHINGLING DEVICE

Filed Jan. 30, 1961 5 Sheets-Sheet 2

GLEN W. OFFENSEND
CHARLES E. SWING
GORDON L. BARRINGER
INVENTORS

BY R. Frank Smith

Paul P. Holmes
ATTORNEYS

May 18, 1965 G. W. OFFENSEND ET AL 3,183,816

CARD SHINGLING DEVICE

Filed Jan. 30, 1961 5 Sheets-Sheet 3

GLEN W. OFFENSEND
CHARLES E. SWING
GORDON L. BARRINGER
INVENTORS

BY R. Frank Smith

Paul P. Holmes
ATTORNEYS

CARD SHINGLING DEVICE

Filed Jan. 30, 1961 5 Sheets-Sheet 4

GLEN W. OFFENSEND
CHARLES E. SWING
GORDON L. BARRINGER
INVENTORS

BY R. Frank Smith
Paul R. Holmes
ATTORNEYS

May 18, 1965 G. W. OFFENSEND ETAL 3,183,816

CARD SHINGLING DEVICE

Filed Jan. 30, 1961 5 Sheets-Sheet 5

GLEN W. OFFENSEND
CHARLES E. SWING
GORDON L. BARRINGER
INVENTORS

BY R. Frank Smith
Paul P. Holmes
ATTORNEYS

United States Patent Office 3,183,816
Patented May 18, 1965

3,183,816
CARD SHINGLING DEVICE

Glenn W. Offensend, Charles E. Swing, and Gordon L. Barringer, Rochester, N.Y., assignors to Eastman Kodak Company, Rochester, N.Y., a corporation of New Jersey Filed Jan. 30, 1961, Ser. No. 85,808
22 Claims. (Cl. 95—85)

This invention relates to a device for arranging and supporting business machine cards in a shingled array.

In some data processing operations in which business machine cards are employed, it is desirable to spread the cards in an overlapped or shingled arrangement, so that printed matter along marginal portions of the cards becomes exposed and can be reproduced. A single reproduction from such an array then provides a record of the information on the exposed portion of each of the cards in the array. The reproduction of the printed matter can be made in any convenient way using standard reproduction techniques, such as, for example, photography, xerography, thermography, and the like.

Shingling a stack of cards can be done by hand, but this is a long, tedious, and often inaccurate and non-uniform operation. Moreover, since it is difficult to keep the cards in proper position in the array, while handling it as necessary for reproduction, some means must be provided for keeping the cards together once they have been arranged in the desired manner.

One object of the present invention is to provide mechanical means by which a stack of business machine cards can be rapidly and accurately disposed in a shingled arrangement.

Another object of the invention is to provide practical means for supporting an array of business machine cards in a shingled arrangement.

Another and related object of the invention is to provide a practical mechanical device for arranging a stack of business machine cards in a shingled array rapidly and efficiently.

Still another object of the invention is to provide a practical mechanical device for arranging a stack of business machine cards in a shingled array, that will insure that the exposed portions of all cards in the array are substantially uniform in size.

Yet another object of the invention is to provide practical means for arranging and supporting a stack of business machine cards in a shingled array, to permit the array to be reproduced efficiently with document copying machinery.

Other objects of the invention will be apparent hereinafter from the specification and from the recital of the appended claims.

Our invention involves a shingling plate that is formed on one of its faces with a series of spaced steps. These steps are disposed to support an array of shingled cards. The card-supporting surfaces are disposed substantially in parallelism, and the steps are proportioned so that the cards in the array can rest thereon respectively, and also upon subjacent cards.

To arrange a stack of cards in a shingled array on the shingling plate, we provide a card separator. This separator is formed so that it can be operated to engage and to move a stack of cards across the face of the shingling plate. As the stack of cards is so moved, the lowermost card in the stack engages one of the step shoulders, and its movement is stopped. The separator is formed at its trailing end with a retainer that permits the lowermost card in the stack to remain stationary, engaged against the step shoulder, while the stack continues its movement over the face of the shingling plate.

The details of the structure and operation of the invention will be better understood from the accompanying drawings.

Referring now in detail to the drawings by numerals of reference, 10 denotes a base in which a shingling plate 11 is mounted. A card separator 12 is mounted for sliding movement relative to the shingling plate 11 and the base 10, over the face of the shingling plate. The structure of these respective parts will now be described in sufficient detail to make their respective purposes and functions clear and to permit thereafter a description of their cooperative action in use.

Figure 1:
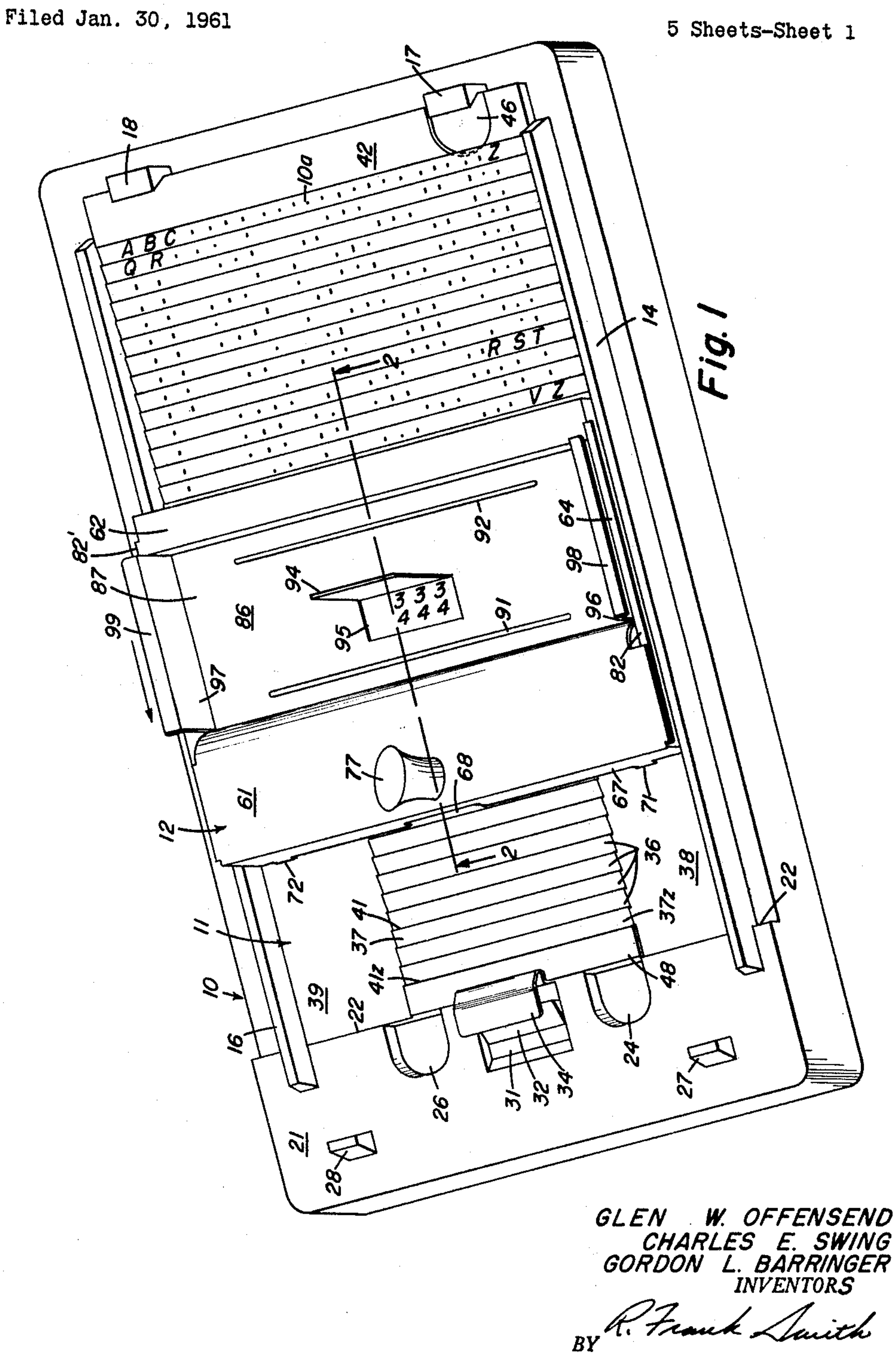
FIG. 1 is a perspective view of a shingling device that is constructed in accordance with one embodiment of this invention, showing a card separator during its travel over the shingling plate, in the process of shingling a stack of cards, and showing several shingled cards arrayed on the shingling plate, the direction of movement of the separator being indicated by an arrow.

The base 10 is generally plate-shaped. A pair of longitudinally-extending rails 14, 16 are secured on its upper face adjacent the opposite sides thereof respectively. A pair of lugs 17, 18 respectively, are mounted adjacent the upper end of the base 10 (its right end as shown in FIG. 1), intermediate the ends of the rails 14, 16, respectively. The base 10 is formed at its lower end (its left end as shown in FIG. 1) with a raised portion 21, to provide a shoulder 22 that extends transversely of the base. The side rails 14, 16, the lugs 17, 18, and the shoulder 22 are disposed and proportioned to receive the shingling plate 11 snugly therebetween. The raised portion 21 of the base, at it slower end, is formed with a pair of recesses 24, 26, to provide access to the lower end of the shingling plate 11.

A pair of lugs 27, 28 are mounted on the raised portion 21 of the base adjacent the ends of the rails 14, 16 respectively.

The raised portion 21 of the base is also formed with a recess 31, within which one end of a spring clip 32 is secured. The spring clip 32 is formed and disposed to engage against the adjacent part of the upper face of the shingling plate 11 under resilient spring pressure, to retain the shingling plate 11 in place on the base. The spring 32 is formed with a tab portion 34 by which it can be grasped to maneuver it.

Figure 5:
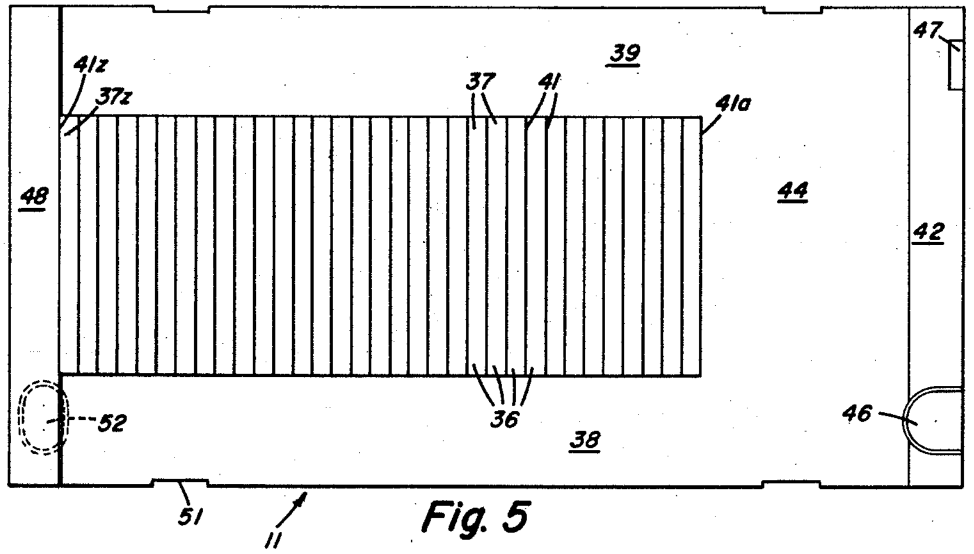
FIG. 5 is a top plan view of the shingling plate, showing the plate in the same relative position as in FIG. 1.

In the preferred embodiment of the invention that is illustrated in the drawings, the shingling plate 11 is formed for use on both of its major faces. On its upper face, that is visible in FIGS. 1 and 5, the shingling plate 11 is formed with a longitudinally-extending central portion in which is formed a series of steps 36. The shingling plate is also formed with a pair of longitudinally-extending flat surfaces 38, 39, at the sides respectively of the central stepped portion. These surfaces are coplanar with each other and, in the assembly of FIG. 1, with the surface 21 at the lower end of the base 10.

Each of the steps 36 consists of a flat surface 37, that is inclined relative to the flat surfaces 38, 39 of the shingling plate 11, and an upright shoulder 41. The inclined surfaces 37, and shoulders 41, are disposed in parallelism respectively. The steps 36 are formed so that the lowermost ends of the inclined surfaces 37 are disposed at the level of the flat adjacent surfaces 38, 39 of the plate, and so that their uppermost ends are disposed above these flat surfaces.

The inclined surfaces 37 are uniform in size, so that when business machine cards are disposed in a shingled array on the steps 36, the marginal portions of the cards, that are exposed, are of a predetermined, uniform size.

At its upper end, the shingling plate 11 is formed with a transversely-extending flat surface 42, that is disposed at the same elevation as the highest parts of the inclined surfaces 37. Between the first shoulder 41*a* (FIG. 5) adjacents the upper end of the shingling plate 11, and the transverse surface 42, and across a central portion of the shingling plate 11 that corresponds in transverse extent to that of the steps 36, the shingling plate 11 is formed an inclined surface 44 that increases in elevation from the lowermost level of the shoulder 41*a* to the level of the surface 42. The inclination of the surface 44 is such that the first and lowermost card 100*a* (FIG. 1), in a shingled array of cards, has its exposed portion disposed at substantially the same elevation as the exposed portions of the other cards in the array.

The shingling plate is also formed in its upper face, at its upper end, with a recess 46 and a notch 47, to provide access to the uppermost card in a shingled array, and to facilitate manipulation of the shingling plate, respectively.

At the lower end of its upper face, the plate 11 is formed with a flat surface 48 that has the same transverse extent as the steps 36. The difference in elevation between the surface 48, and the lowermost part of the last inclined step surface 37, adjacent the lower end of the plate 11, forms the last shoulder 41*z* adjacent the lower end of the plate 11.

In its longitudinally-extending sides, the shingling plate is formed with four channels 51, that extend through its thickness. These channels provide ways in which guide members (not shown), that can be formed in the rails 14, 16, can engage, to assist in manipulating and in positioning the plate 11, particularly to hold it against displacement in a longitudinal direction.

Figure 6:
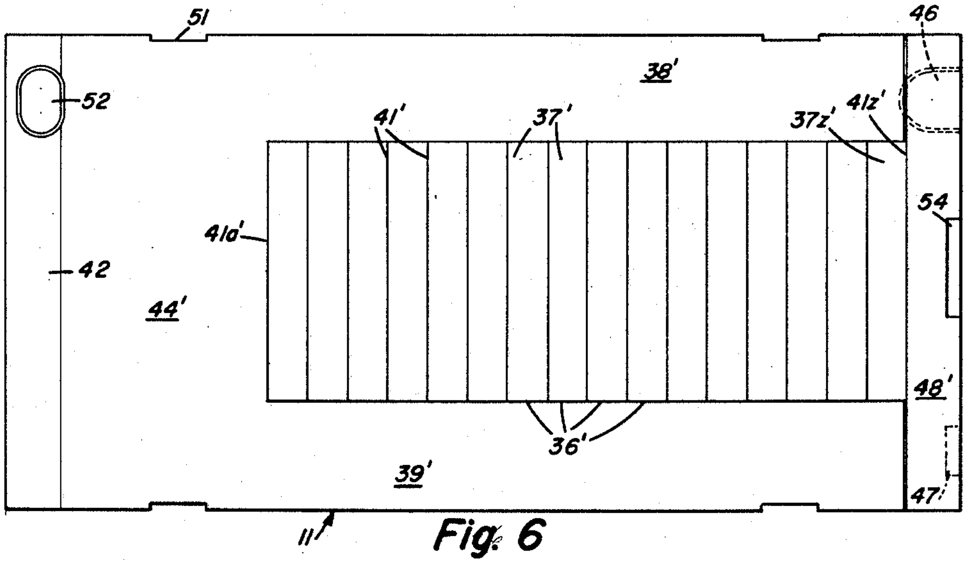
FIG. 6 is a bottom plan view of the shingling plate.

The lower face of the plate 11 is formed in a somewhat similar fashion, as shown in FIG. 6. Thus, the lower face of the plate is formed with trasnverse steps 36′. However, the inclined surfaces 37′, of the steps 36′, are twice as long as the inclined surfaces 37 of the steps 36 on the upper face of the plate 11, so as to expose marginal portions of the shingled business machine cards supported thereon that are twice as large as would be the case with cards shingled on the upper face of the plate 11. However, the shoulders 41′ of the steps 36′ on the lower face of the plate extend the same distance above the flat, longitudinally extending marginal surfaces 38′, 39′, on the lower face of the plate, as the shoulders 41 extend above the corresponding flat surfaces 38, 39 on the upper face of the plate; namely, a distance that corresponds to preferably less than (and in any event not greater than) the thickness of a business machine card of the type that is to be employed with the plate.

Figure 7:
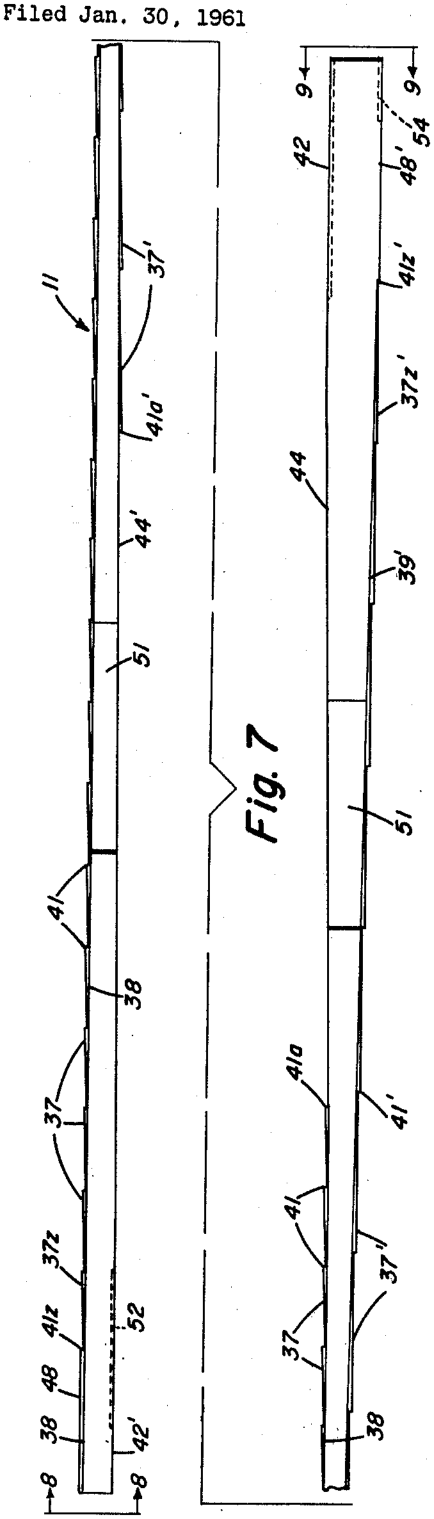
FIG. 7 is a side view, on an enlarged scale, of the shingling plate, said view having been divided into halves in order to show the entire shingling plate in elevation.
Figure 8:
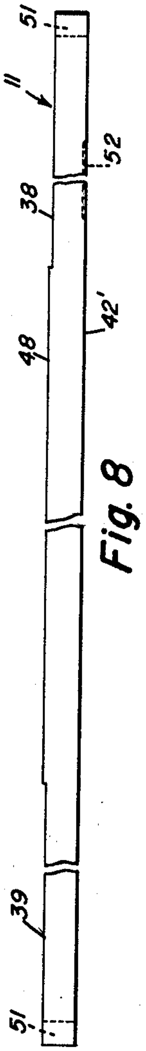
FIG. 8 is a fragmentary end elevation thereof, on an enlarged scale.
Figure 9:
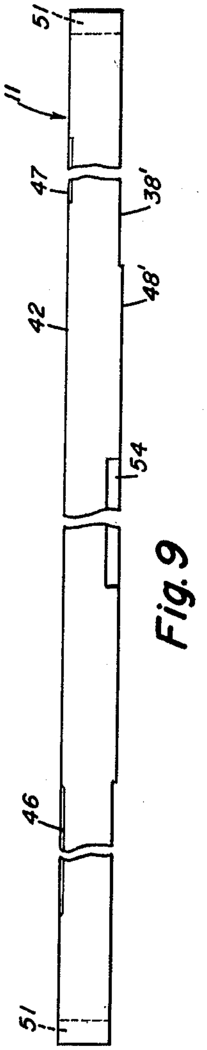
FIG. 9 is a fragmentary end elevation thereof, also on an enlarged scale, showing the end of the shingling plate opposite to that shown in FIG. 8.

The plate 11 is formed near one end of its lower face with a recess 52 that is formed partly in the elevated, transversely extending surface 42′, and partly in the flat, longitudinally-extending marginal surface 38′. The plate is formed in the other end of its lower face with a notch 54 that extends from one end of the plate and across a central area thereof, into the flat, elevated surface area 48′, as best shown in FIGS. 6, 7 and 9.

Figures 2, 3, 4:
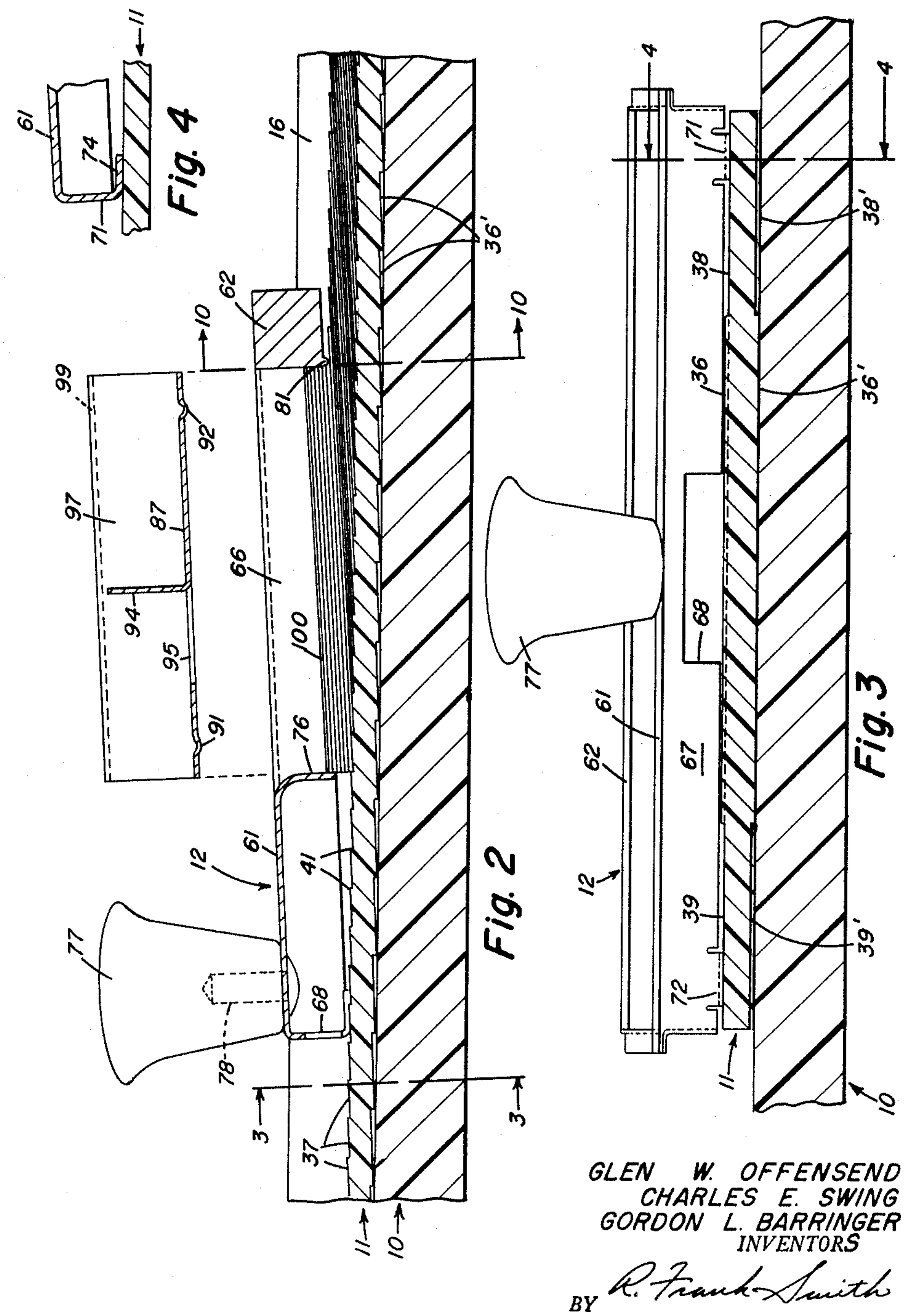
FIG. 2 is an exploded fragmentary, sectional view, on an enlarged scale, taken on the line 2—2 of FIG. 1, looking in the direction of the arrows, the follower being shown above the well of the separator in which it is normally engaged when seated on top of a stack of cards, better to illustrate the structure.
FIG. 3 is a fragmentary sectional view, on the same scale as FIG. 2, taken on the line 3—3 of FIG. 2, looking in the direction of the arrows.
FIG. 4 is a fragmentary sectional view taken on the line 4—4 in FIG. 3, and on the same scale as FIG. 3, looking in the direction of the arrows.

The card separator 12 consists of an open frame for drawing a stack of cards over the shingling plate, and a follower for weighting the stack down on the plate. The frame of the separator comprises a leading member 61 and trailing member 62 that are secured together by a pair of side bars or frame members 64, 66 (FIGS. 1 and 2), to provide a well that can receive a stack of business machine cards, and a follower 86 that can be seated on top of the stack.

The leading member 61 is preferably formed from sheet metal or a similar material. At its leading end, the member 61 is formed with a downwardly depending skirt 67. This skirt 67 is formed with a centrally located recess 68, that is proportioned to permit the member 61 to move freely over the tab 34 of the spring 42 at the lower end of the base 10. The skirt 67 is also formed with a pair of downwardly depending legs 71, 72 respectively, that are disposed at opposite sides of the skirt. Each of these legs is formed with a bent-under extension; thus, the leg 71 is formed with an extension 74 (FIG. 4); to provide skids that engage the flat, longitudinally extending marginal surfaces 38, 39 of the shingling plate, to support the member 61. These legs 71, 72, and the lower edge of the skirt 67, are proportioned so that the skirt 67 is always clear of the steps 36.

The member 61 is formed at its trailing end with a downwardly depending skirt 76 whose lower end is clear of the steps. A knob 77 is secured adjacent the leading end of the member 61 by a fastener 78, to permit the separator to be grasped and moved.

Figure 10:
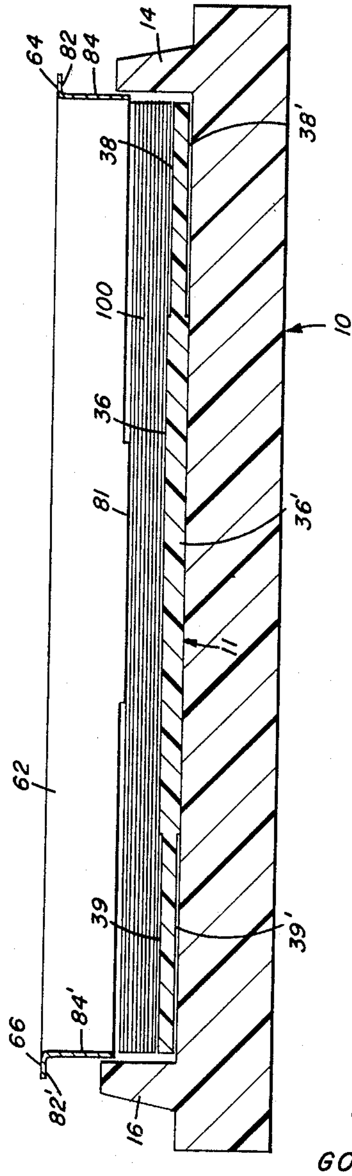
FIG. 10 is a fragmentary sectional view taken on the line 10—10 of FIG. 2, looking in the direction of the arrows.

The trailing member 62 of the separator frame has a generally rectangular cross section, but is formed at its leading lowermost edge with a rounded downward extension or bar 81, whose transverse extent corresponds to that of the steps 36 of the shingling plate. The bar 81 is disposed so that, when the device is in use, it occupies a position directly above the stepped portion of the shingling plate, as shown in FIG. 10.

The side rails 64, 66, of the separator frame are angular in section. Thus, the side rail 64 has a horizontally extending web member 82 that is integrally united with a vertically extending web member 84; and the other side rail 66 has corresponding web portions 82′, 84′, respectively. The horizontally extending web portions 82, 82′, are disposed so that in the assembled device as shown in FIG. 1, they are clear of the upper surfaces of the rails 14, 16 respectively. However, the horizontally extending web portions 84, 84′ are disposed to seat closely adjacent the inner surfaces of the rails 14, 16, respectively, for sliding engagement therewith to guide the movement of the card separator 12 during shingling.

The follower 86 is formed of sheet metal or like material. It has a flat web portion 87 that is formed with a pair of transversely extending, depressed ribs 91, 92. A tab 94 is struck out of the central portion of the web 87 and projects upwardly to provide means of grasping the follower. This arrangement also provides a window 95 to expose to view a portion of a business card beneath the follower. The follower 86 is formed at its lateral sides with upstanding arms 96, 97, that are disposed for sliding engagement with the internal surfaces of the web portions 84, 84′ of the side bars 64, 66 respectively. The arms 96, 97 are formed with integral, outwardly extending wings 98, 99 respectively.

The follower 86 is proportioned so that it can fit loosely within the well that is formed in the separator, when placed upon the uppermost card in a stack 100 of cards.

To use the device, to arrange a stack of business machine cards in a shingled array, the shingling plate 11 is placed upon the base 10 by sliding the upper end of the plate 11 beneath the lugs 17, 18 at the upper end of the base. Then the tab 34 of the spring 32 is maneuvered to move it out of the way, and the shingling plate is dropped in place before releasing the tab. The shingling plate is positioned so that the steps of the desired size are uppermost.

The separator 12 is then placed on the shingling plate, at its upper end. The follower 86 is removed, and a stack 100 of cards, preferably equal in number to the number of steps on the exposed surface of the shingling plate, is placed in the well of the separator, so that the lowermost card rests directly upon the shingling plate. The follower 86 is then placed in the well, upon the stack of cards.

The knob 77 is then grasped and the separator is drawn over the shingling plate, from the upper end toward the lower end of the device. As the separator 12 is moved, the trailing edge of the stack of cards engages against the leading face of the member 62 of the separator frame. The lowermost card in the stack slides over the inclined surface 44 until the card butts up against the shoulder 41*a*. This stops the movement of the lowermost card, and as the movement of the separator 12 is continued, the stopped card is forced to slide under the round lower face of the bar 81, and thus leaves the stack of cards.

As the movement of the separator 12 over the shingling plate continues, the stack of cards is drawn over the steps 36 and one card after another is brought into engagement with a shoulder 41 and is thus stopped and forced under the bar 81, out of the separator and out of the stack, onto the surface of the shingling plate. As the cards leave the stack, the follower 86 settles by gravity, and it exerts a continuous pressure upon the stack of cards, to urge the cards against the shingling plate. The weight of the trailing member 62 of the separator frame presses the bar 81 down with a substantial amount of pressure, to retain the cards in the stack, except when the lowermost is forced out by the action of the shingling plate. The bar 81 also exerts pressure against the shingled cards to press them down against the surface of the shingling plate.

As the separator is moved over the shingling plate, it slides on and is guided by the rails 14, 16, so that the separator 12 and the cards in the stack 100 are held squarely during shingling. The confronting surfaces of the rails 14, 16 also serve, together with shoulders 41, to support and hold the shingled cards in the desired, shingled position.

As the separator 12 approaches the lower end of the device, the recess 68 in the front skirt 67 of the leading member 61 of the separator permits the separator to be drawn over the upwardly projecting tab 34 of the spring 32, until the legs 71, 72 engage against the stops 27, 28. At this point, a card should be engaged against each of the shoulders 41 of the steps 36. The lowermost cards 100*a* in the shingled array is supported on the inclined surface 44 of the shingling plate, and of the remaining cards, one card is supported on each of the inclined surfaces 37 of the steps 36. The separator 12 is then removed from the base, and any remaining cards in the well are also removed. The uppermost card in the shingled array is butted up against the shoulder 41*z*.

The shingled array of cards can be reproduced photographically, xerographically, thermographically, or in any other convenient manner, to record the information that is displayed on the exposed marginal portions of the shingled cards. If it is necessary to do so, the shingling plate, with the cards arrayed thereon, can be removed from the base, for reproduction purposes. With care, the card array on the plate can be moved about with a minimum of disturbance of the array. For example, the shingled array, on the shingling plate, can be placed on the pressure pad of a photographic document copier, for exposure of a matrix and for the production of copies in a conventional manner from the matrix.

After this information has been recorded or reproduced, the shingled cards can be collected quickly by one sweeping movement of the hand, using the uppermost card in the array as a sweep to slide all of the other cards together toward the upper end of the plate. After removal of the cards, the plate can be inserted in the base for re-use.

To use the opposite side of the shingling plate 11, to expose a larger marginal portion of each of the cards in shingled array, the separator 12 is removed and then the spring tab 34 is manipulated to permit the shingling plate to be removed from the base and turned about its end 180°, so that the face of the shingling plate that contains the wider steps 36′ is uppermost. The shingling plate 11 is then replaced on the base and used as before.

In the preferred embodiment of the invention that is illustrated, both the shingle steps and the bar 81 of the separator have substantially less transverse extent that do the cards themselves; the inclined surfaces of the steps are elevated above the plane of the flat marginal portions 38, 39 of the shingling plate; and the follower 86 exerts pressure upon the cards. This arrangement permits the sides of the cards, that extend outwardly over the flat surfaces 38, 39, to droop downwardly, and this promotes the shingling action by insuring that the lowermost card engages against the appropriate shoulder as the stack is moved over the stepped surface. This embodiment of the invention therefore is preferred to a shingling device that includes a place that is formed with steps that extend across its entire width, since with this preferred construction, a card with a bent-up corner will not skim over the step shoulders.

One important advantage of the invention, generally, is that its action is accurate, consistent and dependable, and it is substantially independent of operator technique. Moreover, its action is so simple that little or no training in its operation is required.

While the use of a shingling plate, that has both of its major faces stepped, is convenient, a plate can be used that is flat on one face, equally well for many applications. For some purposes, it is convenient to number the steps, so that, for example, when some steps are empty, the number of cards in the array can be seen at a glance from the number on the first empty step.

The card separator 12 that is illustrated represents a preferred embodiment of the invention. However, the shingling plate 11, whether used alone or mounted in a base, can be used for shingling a stack of cards without a mechanical separator, by simple manual manipulation of the stack to move it in the proper manner over the stepped surface of the shingling plate. However, this requires dexterity and skill, and is not thoroughly reliable. Satisfactory reliability and efficiency in shingling can be achieved by using mechanical card separators of different structures, including that described and illustrated herein, and others.

Some of the important requisites in a mechanical card separator are that it permit only the single lowermost card in the stack to leave the stack at one time; and that it be formed to cooperate with either the shingling plate or the base so that it is guided through a predetermined desired path during shingling so as to dispose the shingled array of cards squarely, and in the desired location. Another important function of the mechanical separator is to apply pressure to the stack of cards to press the lowermost card of the stack firmly into engagement with the step surface of the shingling plate. Separators can be designed to perform these functions, that differ substantially in structure from the illustrated preferred embodiment of the invention.

Thus, in the illustrated preferred embodiment of the invention, when the leading edge of the lowermost card in the stack engages against the shoulder of a step of the shingling plate, the trailing edge of that card is subjected to a continued forward pressure that is applied to it by the separator bar 81, that tends to urge the card to continue its forward movement. Some of the factors that govern the forces that act on the card at that point include the compressive force that is exerted on the lowermost card by the follower and superjacent cards in the stack, the shape of the bar 81 and the smoothness of its surface finish, and forces, such as the weight of the frame member 62, that resists upward displacement of the bar 81 and the structure of which it is a part. These factors are balanced in making a separator in accordance with the preferred embodiment of this invention, so that a smooth separating action is obtained. Equally good separating action can be obtained, however, by other structures performing substantially these same card separator functions, such as, for example, a separator that utilizes a downwardly depending, resilient, flexible member instead of a solid separator bar, to effect separation.

Moreover, a variety of materials may be employed in making the various parts of the device. The shingling plate preferably is made from a molded synthetic resinous material. The base can also be molded from a synthetic resinous material although, like the shingling plate, it can be machined from metal stock, or cast from metal, or made by any other satisfactory technique known to the art.

The separator 12 can be fabricated from sheet metal and angle stock, as described herein, or it too could be molded from synthetic resinous material, or from other suitable materials by known fabricating techniques.

While the invention has been described in connection with a specific embodiment thereof, it will be understood that the invention is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

We claim:

1. A device for supporting and maintaining a group of cards in a shingled arrangement comprising a member having a surface provided with a card support area and co-planar flat surface areas disposed on opposite sides of the card support area, said card support area comprising a series of stepped surfaces disposed, respectively, in spaced parallel planes which are inclined upwardly above the plane of said co-planar flat surface areas for supporting portions of the respective cards of a fanned-out group of cards, the surfaces in said series being separated by shoulders each of which has a height which is not greater than the thickness of one of the cards.

2. A device in accordance with claim 1 wherein the stepped surfaces are so proportioned that cards supported thereon extend laterally from the respective supporting surfaces for the cards, over said flat surface areas.

3. A device for supporting and maintaining a group of cards in a shingled arrangement comprising a member having a surface that is formed with a card support area and generally flat, coplanar surface areas disposed at the sides of said card support area, said member being formed in said card support area with a series of stepped surfaces that are inclined upwardly above the plane of said flat surface areas and that fall, respectively, substantially in spaced, parallel planes, and that are adapted to support portions of cards respectively in a fanned-out group of cards, and wherein said stepped surfaces are so proportioned that cards supported thereon extend laterally from their respective supporting surfaces over said flat surface areas, and, said stepped surfaces are separated by shoulders that are upright relative to said flat surface areas and each of which has an elevation which is not greater than the thickness of one of said cards, and means disposed at opposite sides of the surface of said member to engage opposite lateral edges of said cards.

4. A device for supporting and maintaining a group of cards in a shingled arrangement comprising a member having a surface that is formed with a card support area and generally flat, coplanar surface areas disposed at the sides of said card support area, said member being formed in said card support area with a series of stepped surfaces that are inclined upwardly above the plane of said flat surface areas and that fall, respectively, substantially in spaced, parallel planes, and that are adapted to support portions of cards respectively in a fanned-out group of cards, the stepped surfaces in said series being so proportioned that cards supported thereon extend laterally from their respective supporting surfaces over said flat surface areas, and said stepped surfaces being separated by generally upright shoulders relative to said flat surface areas and each of which has an elevation which is not greater than the thickness of one of said cards, and a pair of rails having generally upright, confronting surfaces disposed at opposite sides of the surface of said member for engagement with opposite lateral edges of said cards.

5. A device for supporting and maintaining a group of cards in a shingled arrangement comprising a plate that is formed on one of its faces with a longitudinally extending centrally located card support area and that has generally flat, longitudinally extending coplanar surface areas disposed at the sides of said card support area, said plate being formed in said card support area with a series of substantially uniformly sized stepped surfaces that are inclined upwardly above the plane of said flat surface areas and at an acute angle thereto and that fall, respectively, substantially in spaced, parallel planes, and that are adapted to support portions of cards respectively in a fanned-out group of cards, and wherein said stepped surfaces are so proportioned that cards supported thereon extend laterally from their respective supporting surfaces over said flat surface areas, and said stepped surfaces are separated by shoulders that are upright relative to said flat surface areas and each of wihch has an elevation which is not greater than the thickness of one of said cards.

6. A device in accordance with claim 5 wherein said plate is similarly formed on both of its faces and wherein the stepped surfaces on one face of the plate have individually greater longitudinal extent that the stepped surfaces on the other side of the plate.

7. Means for shingling cards and for supporting an array of shingled cards comprising in combination a member that has a surface that is formed with a series of steps, said steps being formed with flat surfaces that are adapted to support portions of cards respectively in a fanned-out group of cards, said card-supporting surfaces of said steps being disposed substantially in parallelism, and means engageable with a stack of cards for moving the same in flush sliding contact with said steps and for resisting movement of all but the then lowermost card from said stack when such lowermost card engages a step.

8. Means for shingling cards and for supporting an array of shingled cards comprising, in combination: a member that has one surface that is formed with a series of steps, said steps being formed with flat surfaces that are adapted to support portions of cards respectively in a fanned-out group of cards, the said card-supporting surfaces of said steps being disposed substantially in parallelism; and a separator comprising means engageable with a stack of cards for moving the same over said steps in one direction to dispense cards thereon, and retainer means disposed to engage the trailing edge of said stack and formed to resist movement of all but the then lowermost card from said stack when such lowermost card engages a step.

9. Means for shingling cards and for supporting an array of shingled cards comprising a member that has one surface that is formed with a series of steps, said steps being formed with flat surfaces that are adapted to support portions of cards respectively in a fanned-out group of cards, said card-supporting surfaces of said steps being disposed substantially in parallelism, guide means disposed at least at one side of said member, and separator means that is engageable with a stack of cards for moving said stack over said steps and for urging the stack against said steps during such movement, said separator means being formed to cooperate with said guide means for movement with said stack of cards over said steps.

10. Means for shingling cards and for supporting an array of shingled cards comprising a member that has one surface that is formed with a series of steps, said steps being formed with flat surfaces that are adapted to support portions of cards respectively in a fanned-out group of cards, the said card-supporting surfaces of said steps being disposed substantially in parallelism and being separated by shoulders each of which has a height which is not greater than the thickness of one of said cards, and separator means comprising a frame that is engageable with a stack of cards for moving the same over said steps in a direction to butt the lowermost card against a shoulder, and retainer means disposed to engage the trailing edge of said stack to hold in the stack all but the then lowermost card butting engagement of such lowermost card against a shoulder during such movement of said stack.

11. Means for shingling cards and for supporting a group of cards in shingled arrangement comprising a member having a surface that is formed with a card support area and generally flat coplanar surface areas disposed at the sides of said card support area, said member being formed in said card support area with a series of transversely extending stepped surfaces that fall, respectively, substantially in spaced, parallel planes, that are so proportioned that cards supported thereon extend laterally from their supporting surfaces respectively, over said flat surface areas, and that are adapted to support portions of cards respectively in a fanned-out group of cards, the surfaces in said series being separated by shoulders each of which has a height which is not greater than the thickness of one of said cards, and separator means engageable with a stack of cards to retain said cards in stack form during movement of said stack over said surface of said member in a direction to bring the lowermost card in the stack into engagement with one of said shoulders and to release the then lowermost card in the stack and to leave it on the associated card-supporting surface as movement of the stack and of the separator means is continued upon butting of such lowermost card with a shoulder.

12. Means for shingling cards and for supporting a group of cards in shingled arrangement comprising a member having a surface that is formed with a card support area, said member being formed in said card support area with a series of stepped surfaces that fall, respectively, substantially in spaced, parallel planes, and that are adapted to support portions of cards respectively in a fanned-out group of cards, said stepped surfaces being separated by shoulders, each of which has an elevation which is not greater than the thickness of one of said cards, and separator means comprising a frame for engaging a stack of cards and for moving said stack over said card support area in flush sliding engagement therewith and in a direction to engage the lowermost card in the stack against a shoulder in said card support area, means for urging the lowermost card in said stack against said card support area during movement of said stack, and means mounted on said frame for engaging the trailing edge of said stack to retain all but the then lowermost card in said stack upon engagement of such lowermost card against a shoulder.

13. Means for shingling cards and for supporting a group of cards in shingled arrangement comprising a member having a surface that is formed with a card support area and generally flat coplanar surface areas disposed at the sides of said card support area, said member being formed in said card support area with a series of stepped surfaces that are inclined upwardly above the plane of said flat surface areas and that fall, respectively, substantially in spaced, parallel planes, and that are adpted to support portions of cards respectively in a fanned-out group of cards, the surfaces in said series being separated by shoulders that are upright relative to said flat surface areas and each of which has an elevation which is not greater than the thickness of one of said cards, and separator means comprising a frame that is engageable with a stack of cards for moving said stack over said card support area in flush, sliding engagement therewith, and in a direction to bring the lowermost card in the stack into engagement with one of said shoulders, means for urging the lowermost card in said stack against said card support area during movement of said stack, retainer means mounted on said frame and formed to engage the trailing edge of said stack to retain all but the then lowermost card therein upon engagement of such lowermost card against a shoulder, and means for supporting said frame from said flat surface areas and for slideable movement thereover.

14. Means in accordance with claim 13 wherein said retainer means comprises a downwardly depending, transversely extending rounded bar that is disposed at the trailing end of said frame, for engagement with the exposed surfaces of fanned-out cards along a longitudinally extending tangential contact area of said bar, and for sliding movement over said cards during movement of said separator means over said card support area during shingling.

15. Means for shingling cards and for supporting an array of shingled cards comprising a member that has one surface that is formed with a card support area and with generally flat, coplanar surface areas disposed at the sides of said card support area, said member being formed in said card support area with a series of stepped surfaces that are inclined upwardly above the plane of said flat surface areas and that fall, respectively, substantially in spaced, parallel planes, and that are adapted to support portions of crds respectively in a fanned-out group of cards, said stepped surfaces being separated by shoulders each of which has height which is not greater than the thickness of one of said cards, guide means disposed at least at one side of said member, and separator means comprising a frame that it engageable with a stack of cards for moving the same over said surface of said member in a direction to butt the lowermost card in the stack against a shoulder, means for urging said stack of cards toward said surface of said member during movement of the stack, means cooperating with said guide means for guiding the movement of the separator and said stack of cards over said surface of said member, and retainer means mounted on said separator frame and disposed to engage the trailing edge of said stack to resist movement of all but the then lowermost card from said stack upon butting engagement of such lowermost card against a shoulder.

16. Means in accordance with claim 15 wherein said frame is formed with downwardly depending legs that are engageable against said flat surface areas respectively to support said frame thereon and said legs are formed with broad bearing areas for engagement with and for sliding movement over said flat surface areas, and wherein said legs are formed to elevate said frame at its leading end and to shift its center of gravity toward the trailing end thereof, and wherein said retainer means comprises a transversely extending bar of rounded section and smooth contour that depends downwardly from said frame at its trailing end to support said trailing end.

17. Means for shingling cards and for supporting a group of cards in a shingled arrangement comprising a member having a surface that is formed with a card support area and with generally flat coplanar surface areas disposed at the sides of said card support area, said member being formed in said card support area with a series of stepped surfaces that fall, respectively, substantially in spaced, parallel planes, and that are adapted to support portions of cards respectively in a fanned-out group of cards, and that are inclined upwardly above the plane of said flat surface areas, and that are so proportioned that cards supported thereon extend laterally beyond their respective supporting surfaces and over said flat surface areas, and wherein said stepped surfaces are separated by shoulders that are generally upright relative to said flat surface areas, each shoulder having an elevation which is not greater than the thickness of one of said cards, guide means disposed along at least one side of said first-named surface of said member, and separator means comprising a frame that is engageable with a stack of cards for moving said stack over said card support area in flush sliding engagement therewith, and in a direction to engage the lowermost card in the stack against a shoulder in said card support area, means for constantly urging the lowermost card in said stack against said card support area during movement of said stack, and means cooperating with said guide means to guide the movement of said separator and of said stack of cards over said surface of said member, said separator frame being formed at its leading end with downwardly depending legs to elevate said frame and to shift its center of gravity toward the trailing end thereof, said frame being formed at its trailing end with a transversely extending, downwardly depending bar of rounded section and smooth finish that is disposed to engage the exposed surfaces of fanned-out cards along a longitudinally extending tangential contact area of said bar and to slidably move over said cards during movement of said separator means over said card support area during shingling, said bar being formed to cooperate with said frame and functioning as a retainer for engaging the trailing edge of said stack to resist movement of all but the then lowermost card from said stack upon butting engagement of such lowermost card against a shoulder.

18. Means for shingling cards and for supporting an array of shingled cards comprising a base member that is formed to receive a shingling plate, a shingling plate removably mounted thereon, and separator means mounted for movement over said shingling plate; said base being formed with guide means disposed to extend longitudinally of said shingling plate; said shingling plate being mounted on said base with one of its faces exposed, and being formed on said exposed face with a longitudinally extending centrally located card support area and with generally flat, coplanar surface areas at the sides of said card support area, said plate being formed in said card support area with a series of substantially uniformly sized stepped surfaces that are inclined upwardly above the plane of said flat surface areas at an acute angle thereto and that fall respectively, substantially in spaced, parallel planes, and that are adapted to support portions of cards respectively in a fanned-out group of cards, and wherein said stepped surfaces are so proportioned that cards supported thereon extend laterally from their respective supporting surfaces over said flat surface areas, said stepped surfaces being separated by shoulders that are upright relative to said flat surface areas, each shoulder having an elevation which is not greater than the thickness of one of said cards; said separator means comprising a frame that is engageable with a stack of cards for moving said stack over said card support area in flush sliding engagement therewith and in a direction to engage the lowermost card in said stack against a shoulder in said card support area of the shingling plate, means for constantly urging the then lowermost card in said stack against said card support area during movement of said stack, means cooperating with said guide means of said base to guide said separator means during its movement over the shingling plate, and means mounted on said frame for engaging the trailing edge of said stack of cards to retain all but the then lowermost card therein during butting engagement of such lowermost card against a shoulder in the card support area of said shingling plate.

19. Means in accordance with claim 18 wherein said plate is similarly formed on both of its faces and wherein the stepped surfaces on one face of the plate have individually greater longitudinal extent than the stepped surfaces of the other side of said plate.

20. Means in accordance with claim 18 wherein the frame of said separator means is formed with a well for receiving the stack of cards therein, and wherein said urging means is a follower that is formed to engage in said well and to rest upon the top of a stack of cards when positioned in said well to apply the force of the follower's weight on such stack.

21. Means in accordance with claim 18 wherein said guide means comprises longitudinally extending rails that project upwardly from said base and that are disposed to extend along the longitudinal edges of said plate, and wherein said means of said separator means which cooperates with said guide means comprises parts of the frame of said separator means that are formed and disposed for sliding engagement with at least one of said rails during movement of said separator means.

22. Means in accordance with claim 18 wherein said separator frame is formed at its leading end with downwardly depending legs that are engageable against the said flat surface areas respectively of said plate to support the frame thereon, said legs being formed with broad bearing areas for engagement with and for sliding movement over said flat surface areas, said legs being proportioned to support the leading end of said frame out of contact with said card support area of the shingling plate during movement of said separator means thereover.

References Cited by the Examiner

UNITED STATES PATENTS

| | | | |
|---|---|---|---|
| 380,877 | 4/88 | Fellows | 206—45 |
| 395,048 | 12/88 | Goff | 206—82 |
| 2,695,706 | 11/54 | Allen | 206—82 |

NORTON ANSHER, *Primary Examiner.*

D. B. LOWE, EMIL G. ANDERSON, *Examiners.*

UNITED STATES PATENT OFFICE

CERTIFICATE OF CORRECTION

Patent No. 3,183,816 May 18, 1965

Glenn W. Offensend et al.

It is hereby certified that error appears in the above numbered patent requiring correction and that the said Letters Patent should read as corrected below.

Column 8, line 46, for "wihch" read -- which --; column 9, line 32, after "card" insert -- upon --; column 10, line 50, for "crds" read -- cards --; line 55, for "it" read -- is --.

Signed and sealed this 5th day of October 1965.

(SEAL)
Attest:

ERNEST W. SWIDER
Attesting Officer

EDWARD J. BRENNER
Commissioner of Patents